(12) United States Patent
Wakamatsu et al.

(10) Patent No.: US 6,861,144 B2
(45) Date of Patent: Mar. 1, 2005

(54) POLYCRYSTALLINE SILICON AND PROCESS AND APPARATUS FOR PRODUCING THE SAME

(75) Inventors: Satoru Wakamatsu, Tokuyama (JP); Hiroyuki Oda, Tokuyama (JP)

(73) Assignee: Tokuyama Corporation, Yamaguchi (JP)

( * ) Notice: Subject to any disclaimer, the term of this patent is extended or adjusted under 35 U.S.C. 154(b) by 349 days.

(21) Appl. No.: 10/030,657

(22) PCT Filed: May 9, 2001

(86) PCT No.: PCT/JP01/03865

§ 371 (c)(1), (2), (4) Date: Jan. 11, 2002

(87) PCT Pub. No.: WO01/85613

PCT Pub. Date: Nov. 15, 2001

(65) Prior Publication Data

US 2002/0104474 A1 Aug. 8, 2002

(30) Foreign Application Priority Data

May 11, 2000 (JP) ........................................ 2000-139023

(51) Int. Cl.$^7$ ................................................ B32B 5/16
(52) U.S. Cl. ..................... 428/402; 117/204; 117/205; 117/902; 117/935; 423/348
(58) Field of Search .......................... 428/402; 117/204, 117/205, 902, 935; 423/348

(56) References Cited

U.S. PATENT DOCUMENTS

| | | | |
|---|---|---|---|
| 4,176,166 A | | 11/1979 | Carman |
| 4,460,412 A | * | 7/1984 | Imura et al. ................. 427/530 |
| 4,547,258 A | | 10/1985 | Witter et al. |
| 4,710,260 A | | 12/1987 | Witter et al. |
| 4,737,348 A | | 4/1988 | Levin |
| 4,994,107 A | | 2/1991 | Flagan et al. |
| 5,164,138 A | * | 11/1992 | Dietl et al. .................. 264/600 |
| 5,382,412 A | * | 1/1995 | Kim et al. ................... 422/142 |
| 5,469,200 A | * | 11/1995 | Terai ............................ 347/63 |
| 6,350,312 B1 | * | 2/2002 | Phillips et al. ................ 117/13 |

FOREIGN PATENT DOCUMENTS

| | | |
|---|---|---|
| JP | 51-37819 | 3/1976 |
| JP | 52-133085 | 11/1977 |
| JP | 54-124896 | 9/1979 |
| JP | 56-63813 | 5/1981 |
| JP | 59-501109 | 6/1984 |
| JP | 59-121109 | 7/1984 |
| JP | 59-162117 | 9/1984 |
| JP | 62-7619 | 1/1987 |
| JP | 10-33969 A | 2/1998 |
| JP | 10-273310 A | 10/1998 |
| JP | 11-314996 A | 11/1999 |

OTHER PUBLICATIONS

Giovanni Sotgiu et al.; Thin Solid Films, vol. 297, No. 1–2, Apr. 1, 1997, pp. 18–21.

G.F. Cerofolini et al.; Materials Science and Engineering, vol. 27, No. 1–2, Apr. 2000. pp. 1–52.

* cited by examiner

Primary Examiner—H. Thi Le
(74) Attorney, Agent, or Firm—Birch, Stewart, Kolasch & Birch, LLP

(57) ABSTRACT

Foamed polycrystalline silicon having bubbles therein and an apparent density of 2.20 g/cm$^3$ or less. This silicon generates an extremely small amount of fine grains by crushing and can be easily crushed. There is also provided a method of producing foamed polycrystalline silicon. There is further provided a polycrystalline silicon production apparatus in which the deposition and melting of silicon are carried out on the inner surface of a cylindrical vessel, a chlorosilane feed pipe is inserted into the cylindrical vessel to a silicon molten liquid, and seal gas is supplied into a space between the cylindrical vessel and the chlorosilane feed pipe.

14 Claims, 5 Drawing Sheets

F I G. 2
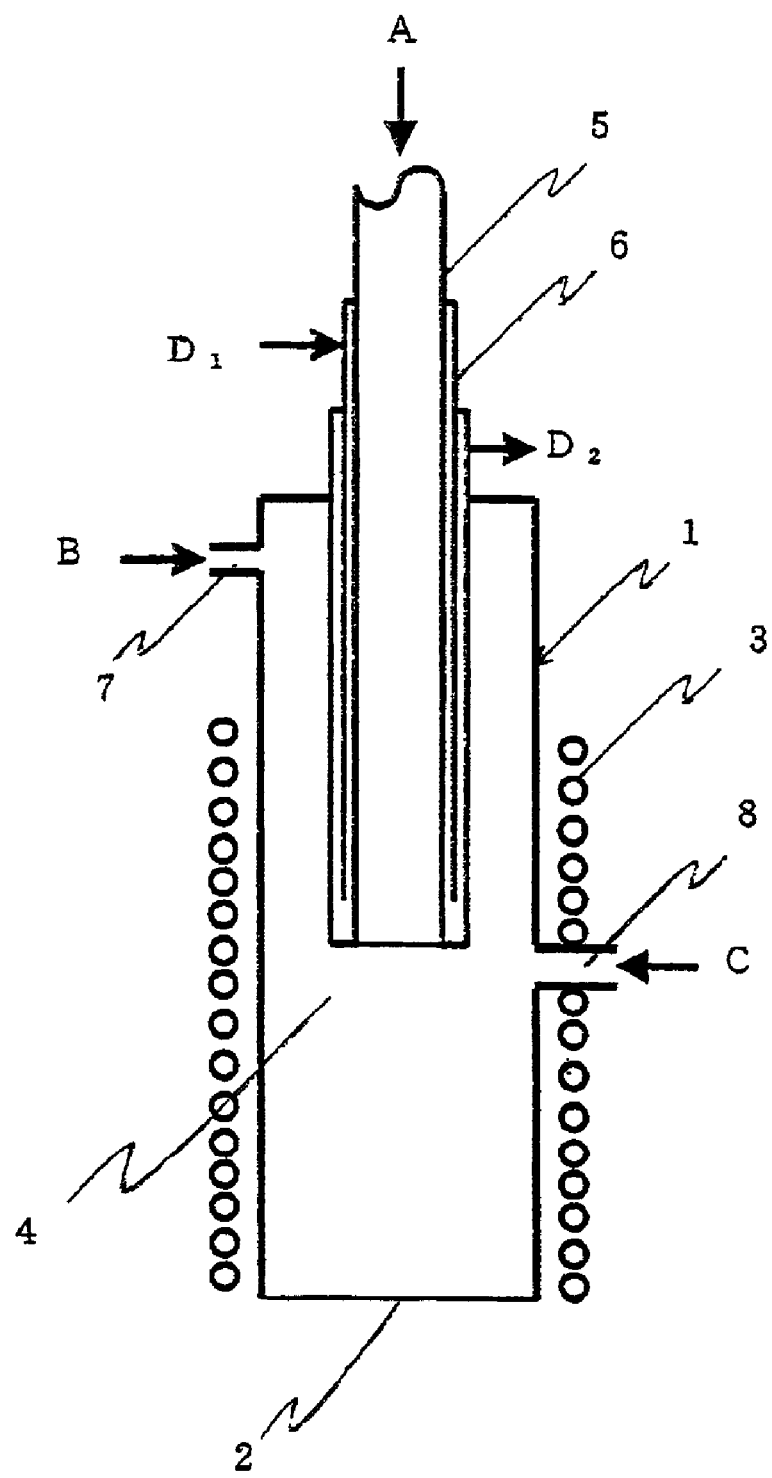

F I G. 5
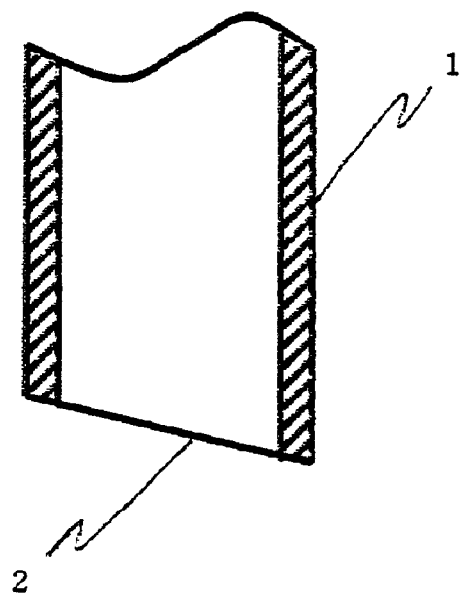
F I G. 6
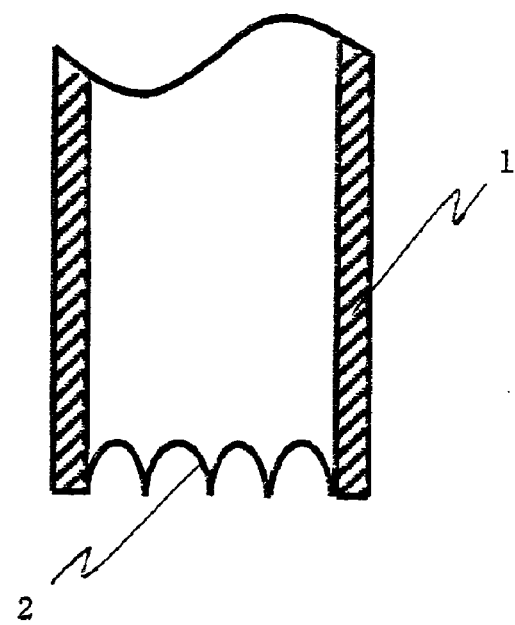

POLYCRYSTALLINE SILICON AND PROCESS AND APPARATUS FOR PRODUCING THE SAME

This application is the national phase under 35 U.S.C. § 371 of PCT International Application No. PCT/JP01/03865 which has an International filing date of May 9, 2001, which designated the United States of America.

FIELD OF THE INVENTION

The present invention relates to novel polycrystalline silicon, and a process and apparatus for producing the same. More specifically, it relates to foamed polycrystalline silicon which is soft and generates an extremely small amount of fine grains when it is crushed, a method of producing the same stably, and a polycrystalline silicon production apparatus which is suitable for the production of the polycrystalline silicon, capable of producing polycrystalline silicon continuously and stably at a high speed for a long time and extremely useful from an industrial point of view.

PRIOR ART

Heretofore, there have been known various methods of producing polycrystalline silicon used as a raw material for a semiconductor or photo voltaic and some of them have already been carried out on an industrial scale.

For example, one of the methods is called "Siemens method" that a silicon rod heated at the deposition temperature of silicon by energization is placed in a bell jar and trichlorosilane ($SiHCl_3$, to be abbreviated as TCS hereinafter) or monosilane ($SiH_4$) is contacted to the silicon rod together with reducing gas such as hydrogen to deposit silicon.

Demand for granular polycrystalline silicon obtained by crushing the above polycrystalline silicon to a diameter of about 300 $\mu$m to 2 mm is growing. For example, the granular polycrystalline silicon is molten for use in semiconductors and photo voltaic.

There is also known a technology for producing fine granular silica having a diameter of about 1 $\mu$m by introducing the granular polycrystalline silicon into oxyhydrogen flames to be molten and evaporated.

Further, a silicon nano-grain which attracts much attention as a visible light emission element is produced by irradiating a silicon target with an excimer laser beam in a helium atmosphere. If the granular polycrystalline silicon can be easily acquired as a silicon target material, the silicon nano-grain can be produced efficiently.

The above granular polycrystalline silicon has been produced by crushing a nugget obtained by breaking a silicon rod produced by the Siemens method to a size as big as a fist.

However, when the granular polycrystalline silicon is to be obtained by breaking the above silicon rod, as breaking is difficult, broken pieces called flaky, needle-like and powdery "fine grains" are generated by breaking in large quantities. The fine grains are the source of dust and difficult to handle. Since there is a possibility that fine grains having a diameter of 150 $\mu$m or less in particular catch fire, they are discarded carefully. Therefore, the fine grains not only reduce yield from the raw material but also require a great deal of labor for disposal.

Meanwhile, the above Siemens method is characterized by obtaining high-purity silicon and has been carried out as the most general method. However, as silicon is deposited in a batch manner, very troublesome operations such as the installation of a silicon rod as a seed, heating of the silicon rod by energization, deposition, cooling, extraction and cleaning of a bell jar must be carried out.

Another method for obtaining polycrystalline silicon is a deposition method making use of a fluidized bed. In this method, the fluidized bed is used and the above monosilane is supplied while a small silicon seed as big as about 100 $\mu$m is supplied as a deposition nucleus to deposit silicon on the silicon seed and extract a silicon grain as big as 1 to 2 mm continuously.

This method eliminates the need of terminating a reaction for extracting silicon and makes possible relatively long-term continuous operation.

However, in the above method which is carried out on an industrial scale, as monosilane which has a low deposition temperature is used as a silicon source material, fine powdery silicon is generated by the thermal decomposition of the monosilane or silicon is readily deposited on the wall of a reactor even at a relatively low temperature range, thereby making it necessary to clean or exchange the reactor regularly.

Further, since silicon seeds in a fluidized state to be deposited are violently contacted to the wall of the reactor for a long time and rubbed, the above method also involves a problem with the purity of the formed silicon.

To solve the above problems of the existing technology, JP-A 59-121109, JP-A 54-124896 and JP-A 56-63813 (the term "JP-A" as used herein means an "unexamined published Japanese patent application") propose a method in which a reactor is heated at a temperature equal to or higher than the melting point of silicon, a silane is supplied into the reactor as a source material to be deposited, silicon is deposited and molten, its molten liquid is stored, and silicon in a molten state or its molten product is solidified by cooling and extracted to the outside of the reactor continuously or intermittently.

However, particularly in the method using monosilane, as monosilane has the property of decomposing by itself even in an atmosphere of relatively low temperature gas and generating fine powdery silicon, blocking in a gas downstream region is apprehended.

In any one of the methods conventionally proposed, a connection portion between the reactor and a silane feed pipe or a portion therearound has a temperature gradient from the melting temperature to a temperature at which silicon does not deposit. As a result, there is always a portion having a temperature range at which silicon deposits by self-decomposition and the portion may be blocked with silicon which is deposited by carrying out the method on an industrial scale.

No report on simple and effective means of preventing blocking caused by the deposition of silicon has been made yet.

JP-A 11-314996 discloses a method of producing crystalline silicon, for example, polycrystalline silicon, using an apparatus comprising a heat generating solid, a high-frequency induction coil arranged opposite to the under surface of the heat generating solid and at least one gas outlet formed in the coil, the method comprising blowing a raw material gas containing a deposition component against the under surface of the above heat generating solid high-frequency induction coil heated by the high-frequency induction coil from the above gas outlet, depositing and melting the above deposition component on the under surface of the above heat generating solid, and dropping or flowing down the deposited molten liquid from the bottom of the above heat generating solid.

However, this method has such a problem as high energy consumption because the high-frequency induction coil which needs to be cooled by water to retain its function absorbs heat because the high-frequency induction coil is in close vicinity to the heat generating solid. This publication is silent about the production of foamed polycrystalline silicon.

OBJECTS OF THE INVENTION

It is a first object of the present invention to provide foamed polycrystalline silicon which generates an extremely small amount of fine grains by crushing for the production of a crushed product of polycrystalline silicon.

It is a second object of the present invention to provide a method of producing the above polycrystalline silicon with high reproducibility and stability.

It is a third object of the present invention to provide an apparatus for producing polycrystalline silicon, which is suitable for use in the above method of producing polycrystalline silicon, capable of producing polycrystalline silicon continuously and stably at a high speed for a long time and extremely useful from an industrial point of view.

Other objects and advantages of the present invention will become apparent from the following description.

SUMMARY OF THE INVENTION

To attain the first object, the inventors of the present invention have confirmed that fine grain generation mechanism in the crushing of polycrystalline silicon is based on the cleavage of polycrystalline silicon. That is, since polycrystalline silicon cleaves easily, when a nugget obtained by breaking the above silicon rod is further crushed to obtain granular polycrystalline silicon, flaky and needle-like fine grains are easily generated in large quantities.

Based on knowledge that the generation of fine grains by crushing can be suppressed by providing a structure that polycrystalline silicon is enough to be crushed under much lower stress than necessary stress for indicating cleavage to a polycrystalline silicon structure, by employing a bubble enveloping structure which is unknown in the prior art as a form of polycrystalline silicon, energy for crushing silicon can be caused to act as energy for breaking the wall of a bubble before it is applied to the cleaved surface of crystals, thereby making it possible to drastically reduce the proportion of fine grains to be discarded compared with ordinary silicon crushed products.

In order to fully develop an effect obtained by the existence of the above bubbles, it has been found that it is effective to adjust the amount of the bubbles to a value corresponding to a specific apparent density or less. The present invention has thus been accomplished based on this finding.

Therefore, according to the present invention, firstly, the above objects and advantages of the present invention are attained by foamed polycrystalline silicon which contains bubbles therein and has an apparent density of 2.20 g/cm$^3$ or less, based on the above knowledge.

To attain the second object of the present invention, although it is known that gas rarely dissolves in a molten metal such as a silicon molten liquid, the inventors of the present invention have found that when the gas is hydrogen, it can be dissolved in a certain amount. Based on this knowledge, they have conducted studies and have found that after hydrogen is contacted to a silicon molten liquid to be dissolved in the liquid, the molten liquid is naturally dropped as droplets and solidified under specific cooling conditions to obtain solidified polycrystalline silicon containing hydrogen existent in the droplets as bubbles.

Therefore, according to the present invention, secondly, the above objects and advantages of the present invention are attained by a method of producing foamed polycrystalline silicon, comprising naturally dropping droplets of silicon containing hydrogen which is molten in the presence of hydrogen in 0.2 to 3 seconds and cooling the droplets until hydrogen bubbles are locked up in the droplets.

To attain the third object of the present invention, the inventors of the present invention have confirmed that low heat consumption can be obtained when a heater having a silicon deposition surface is made cylindrical and the deposition and melting of silicon are carried out on the inner surface of the heater. They have found the following. That is, based on the principles that silicon will not deposit if a raw material gas is not existent in an area heated to the deposition temperature of silicon and that silicon will not deposit substantially if the region where the raw material gas is existent does not reach the deposition temperature, it is possible to continuously extract silicon in a molten state while the formation of solid silicon on the inner wall of a reactor is extremely effectively suppressed, by using a chlorosilane whose silicon deposition start temperature is closer to the melting point of silicon than monosilane as a source material gas, making the feed pipe of the source material gas open in a cylindrical heater as the above heater to directly supply the source material gas into a high-temperature region for carrying out the deposition and melting of silicon, supplying hydrogen into the region and supplying seal gas into the space between the source material gas feed pipe and the cylindrical heater.

Therefore, according to the present invention, thirdly, the above objects and advantages of the present invention are attained by a polycrystalline silicon production apparatus comprising:

(a) a cylindrical vessel having an opening which is a silicon take-out port at the lower end;

(b) a heater for heating the inner wall from the lower end to a desired height of the cylindrical vessel at a temperature equal to or higher than the melting point of silicon;

(c) a chlorosilane feed pipe which is composed of an inner pipe having a smaller outer diameter than the inner diameter of the above cylindrical vessel and constituted such that one opening of the inner pipe faces down in a space surrounded by the inner wall heated at a temperature equal to or higher than the melting point of silicon; and (d) a first seal gas feed pipe for supplying seal gas into a space defined by the inner wall of the cylindrical vessel and the outer wall of the chlorosilane feed pipe.

The foamed polycrystalline silicon of the present invention can be obtained efficiently by the above apparatus. That is, as hydrogen is existent in the silicon deposition and melting area in the above apparatus, hydrogen can be contacted to a silicon molten liquid formed on the surface of the cylindrical vessel which is a heater and dissolved in the liquid, the resulting product is naturally dropped from the periphery of the opening at the lower end of the cylindrical vessel as droplets, and the droplets are received on a suitable coolant and collected, thereby making it possible to produce the above foamed polycrystalline silicon efficiently.

BRIEF DESCRIPTION OF THE DRAWINGS

FIG. 2 is a schematic diagram of another basic embodiment of the polycrystalline silicon production apparatus of the present invention;

FIG. 5 is a sectional view of a typical embodiment of a cylindrical vessel used in the polycrystalline silicon production apparatus of the present invention; and FIG. 6 is a sectional view of another typical embodiment of a cylindrical vessel used in the polycrystalline silicon production apparatus of the present invention.

BEST MODE FOR CARRYING OUT THE INVENTION

Figure 1:
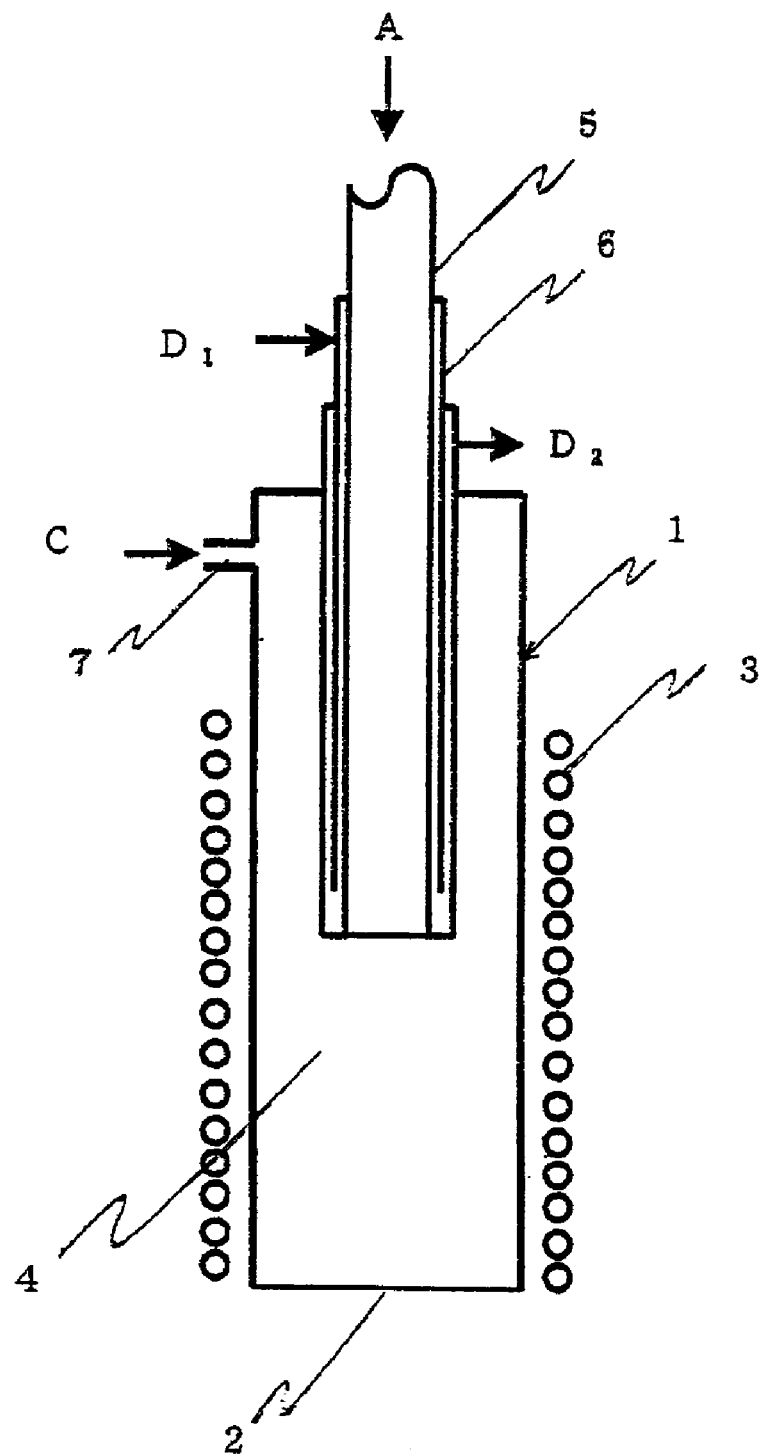
FIG. 1 is a schematic diagram of a basic embodiment of the polycrystalline silicon production apparatus of the present invention.

Bubbles are existent in the interior of the foamed polycrystalline silicon of the present invention. Thus, a polycrystalline silicon structure containing bubbles therein has been unknown heretofore and is a big feature of the foamed polycrystalline silicon of the present invention.

That is, as for a polycrystalline silicon rod obtained by the above Siemens method, hydrogen gas is used as a raw material but deposited polycrystalline silicon is solid and hydrogen does not dissolve in the polycrystalline silicon.

There is also proposed a method in which silicon is deposited using hydrogen as one of raw materials and collected as a molten liquid. Since the molten liquid is extracted outside a hydrogen atmosphere and solidified in the method, hydrogen gas contained in the solid is diffused and gone in a molten liquid state.

There is further proposed a method of producing polycrystalline silicon seed by dropping silicon formed in hydrogen gas onto a rotary disk in a molten state and scattering it. As the renewal of the surface of a silicon droplet occurs violently when the silicon droplet is scattered in this method, the dissolved hydrogen gas escapes and foamed polycrystalline silicon in which the dissolved hydrogen gas has grown into bubbles cannot be obtained.

Further, although polycrystalline silicon obtained by using monosilane as a source material gas and growing polysilicon grains in a fluidized bed contains a relatively large amount of hydrogen, the hydrogen bonded to silicon is existent in the polycrystalline silicon and cannot be existent as bubbles.

The foamed polycrystalline silicon of the present invention may have any shape if it contains bubbles therein. For example, it is generally and preferably in the form of an independent grain having no fixed shape. The independent grain has a volume of preferably 0.01 to 3 cc, particularly preferably 0.05 to 1 cc. The grain obtained by the production method to be described hereinafter may be in the form of a partly fused agglomerate according to a cooling mode. Agglomeration can be easily separated by releasing a fused portion by slightly crushing the agglomerate to obtain the above independent grain having no fixed shape easily.

The foamed polycrystalline silicon of the present invention is preferably an assembly of independent grains or an agglomerate of independent grains.

Preferably, 50 g or more of independent grains each having a weight of 0.1 to 2 g are contained based on 100 g of the assembly of independent grains. More preferably, 80 g or more of independent grains each having a weight of 0.1 to 2 g are contained based on the same standard.

Further, the foamed polycrystalline silicon grain of the present invention contains a plurality of independent bubbles which are existent in a center portion of the grain.

In the present invention, the amount of bubbles in the foamed polycrystalline silicon corresponds to an apparent density of 2.20 g/cm$^3$ or less, preferably 2.0 g/cm$^3$ or less, more preferably 1.8 g/cm$^3$ or less.

Although the true density of polycrystalline silicon is 2.33 g/cm$^3$, when polycrystalline silicon contains bubbles, the apparent density thereof lowers. Bubbles are contained in the foamed polycrystalline silicon of the present invention to ensure that the apparent density should become 2.20 g/cm$^3$ or less, thereby making it possible to greatly suppress the generation of fine grains by crushing.

In the present invention, the apparent density is a value obtained from the volume and weight of the grain measured by a picnometer. Deaeration is carried out by a vacuum deaeration method. More specifically, the method described in Powder Engineering Handbook (published by Nikkan Kogyo Shimbun on Feb. 28, 1986) at pp. 51 to 54 may be used.

When the foamed polycrystalline silicon of the present invention is directly supplied into a crucible for the production of monocrystalline silicon as silicon to be recharged as it is light, it has a merit that a spray of a silicon molten liquid is hardly formed in the crucible and the silicon is useful even in an uncrushed state.

In the above foamed polycrystalline silicon, a large number of bubbles maybe uniformly existent as described above, or one or several large bubbles may be existent. However, the diameter of each bubble is preferably 50 $\mu$m or more.

In the present invention, as the foamed polycrystalline silicon having an extremely small apparent density may be difficult to be produced and handled, polycrystalline silicon preferably has an apparent density of 1 g/cm$^3$ or more.

According to the present invention, there is also provided a crushed product of the foamed polycrystalline silicon of the present invention by making use of the above property of the foamed polycrystalline silicon of the present invention. This crushed product preferably has an average grain diameter in the range of greater than 200 $\mu$m to 5 mm. The above average grain diameter is obtained using a JIS-Z8801 sieve. This crushed product often has a broken section broken at a bubble portion of the foamed polycrystalline silicon.

Gas existent in the bubbles of the polycrystalline silicon of the present invention is generally hydrogen gas according to the production method to be described hereinafter but not limited to this.

The method of crushing the foamed polycrystalline silicon of the present invention is not particularly limited and the crushed product of polycrystalline silicon can be obtained at a high yield by suppressing the generation of fine grains in accordance with the crushing method using a known crusher such as a jaw crusher or pin mill.

The polycrystalline silicon production method of the present invention is not particularly limited but is preferably carried out by forming a droplet from silicon molten in a hydrogen gas atmosphere making use of the fact that hydrogen gas is easily dissolved in a silicon molten liquid, naturally dropping the droplet and cooling it to such a state that hydrogen bubbles are locked up in the droplet as described as the above method of producing polycrystalline silicon.

Although melting or molten silicon may be contacted to hydrogen gas to obtain molten silicon in the presence of hydrogen in the method of producing foamed polycrystalline silicon of the present invention, the deposition of silicon from a chlorosilane and the melting of the silicon are carried out simultaneously in the presence of hydrogen to dissolve hydrogen in a silicon molten liquid most efficiently.

Stated more specifically, a mixed gas of hydrogen gas and a chlorosilane is contacted to the surface of a heater heated at a temperature equal to or higher than the melting point of silicon to carry out the deposition and melting of silicon simultaneously.

The above chlorosilane is preferably a chlorosilane containing hydrogen in the molecule, such as trichlorosilane or dichlorosilane, to further improve the content of hydrogen in the silicon molten liquid.

The ratio of hydrogen to the above chlorosilane may be a known ratio without restriction but the molar ratio of hydrogen to the chlorosilane is preferably adjusted to 5 to 50 in order to form a high-concentration hydrogen atmosphere.

This silicon molten liquid containing hydrogen is naturally dropped as a droplet and the above hydrogen bubbles are locked up in the droplet in 0.2 to 3 seconds. The method of locking up the bubbles in the droplet is not particularly limited but the method in which the droplet is contacted to a coolant having a surface temperature of 1,100° C. or lower, preferably 1,000 or lower, particularly preferably 500° C. or lower is effective and advantageously used in the present invention.

In the above method, it is important to naturally drop the silicon molten liquid as a droplet. That is, over saturated hydrogen gas existent in the silicon molten liquid gathers and grows into bubbles along the passage of time. If the molten liquid is directly solidified, the bubbles will go up by the influence of gravity and hydrogen gas dissolved in the liquid will be discharged to the outside extremely easily.

In contrast to this, the above silicon molten liquid is naturally dropped to enter a non-gravity state where no floating force is existent, whereby gasified hydrogen remains in the droplet. This natural drop time is preferably 0.2 to 2 seconds.

In this case, the mechanism that the bubbles remain in the droplet and collect in the center portion is assumed as follows. That is, when the molten liquid is dropped from a base material holding the molten liquid, a droplet has momentum derived from transformation and tries to become globular due to its surface tension immediately, whereby the momentum derived from transformation changes into rotary angular momentum and centrifugal force is applied to the interior of the droplet by the above rotary motion without gravity. This centrifugal force replaces gravity and floating force serves to direct bubbles of hydrogen existent in the interior toward the center portion, whereby bubbles gather in the center portion of the droplet.

The condition for the collection of the bubbles in the center portion depends upon the rotary angular speed of the droplet and the elapsed time. As for the initial momentum applied to the droplet, the rotary momentum and the angular speed increase as the droplet threads longer when it is separated. That is, as adhesion between the silicon molten liquid and the base material becomes higher, bubbles contained in the droplet collect in the center portion faster and remain more easily. When adhesion with the silicon molten liquid is taken into consideration, $SiO_2$ and silicon nitride may be used as the base material but SiC having high wettability or a carbon material which has low initial wettability but readily forms a silicide to increase its wettability is preferred to exhibit the effect of the present invention more markedly.

In the above method of the present invention, the time elapsed from the time when the silicon droplet separates from the heater to the time when bubbles are locked up in the droplet must be a time during which bubbles can collect in the center portion of the droplet and be retained to such an extent that the above apparent density of the present invention can be attained, for example, 0.2 second or more, more preferably 0.4 second or more, much more preferably 0.6 second or more.

Since bubbles collected in the center are scattered and escaped to the outside when they are cooled gradually, the above time is 3 seconds or less, preferably 2 seconds or less.

The time from the time when the silicon droplet separates from the heater to the time when bubbles are locked up in the droplet is preferably made slightly longer when silicon nitride having poor wettability is used as the base material than when SiC which can increase the angular speed sufficiently is used because the angular speed given to the droplet slightly differs according to the material of the heater.

In the present invention, in the operation of contacting the droplet to the coolant, the coolant is not particularly limited and may be solid, liquid or gas.

As a preferred example of the coolant, a material which does not react with silicon substantially, such as silicon, copper or molybdenum is used as the coolant and a silicon molten liquid droplet is dropped onto the coolant, or a liquid refrigerant which does not react with silicon substantially, such as liquid silicon tetrachloride or liquid nitrogen is used as the coolant and a silicon molten liquid droplet is dropped into the coolant.

Cooling gas generated by spraying the above refrigerant may be contacted to the silicon molten liquid droplet as a refrigerant.

When the above solid coolant is used, its surface may be cooled by a known cooling method directly or indirectly as required. There is a case where silicon molten liquid droplets are dropped onto the coolant one after another and solidified with the result that foamed polycrystalline silicon is piled up. In this case, the topmost surface of the foamed polycrystalline silicon functions as the coolant. To absorb impact when the silicon molten liquid droplets fall on the surface of the coolant, the surface of the coolant is preferably uneven. For example, grains such as silicon grains are preferably existent on the surface. In this case, part of the obtained foamed polycrystalline silicon is preferably used as the silicon grains.

The apparatus for carrying out the method of the present invention is not particularly limited but an apparatus shown as the above polycrystalline silicon production apparatus is preferred as the apparatus for dropping silicon molten liquid droplets continuously.

FIG. 1 and FIG. 2 are schematic diagrams of a basic embodiment of the above apparatus. That is, the production apparatus shown in FIG. 1 and FIG. 2 comprises:
(a) a cylindrical vessel having an opening which is a silicon take-out port at the lower end;
(b) a heater for heating the inner wall from the lower end to a desired height of the cylindrical vessel at a temperature equal to or higher than the melting point of silicon;
(c) a chlorosilane feed pipe which is composed of an inner pipe having a smaller outer diameter than the inner diameter of the above cylindrical vessel and constituted such that one opening of the inner pipe faces down in the space surrounded by the inner wall heated at a temperature equal to or higher than the melting point of silicon;
(d) a first seal gas feed pipe for supplying seal gas into the space defined by the inner wall of the cylindrical vessel and the outer wall of the chlorosilane feed pipe; and further optionally (e) a hydrogen feed pipe for supplying hydrogen gas into the above cylindrical vessel.

The hydrogen feed pipe may be omitted when hydrogen is supplied from the above first seal gas feed pipe.

In the silicon production apparatus of the present invention, the cylindrical vessel 1 may have an opening 2 as a silicon take-out port from which deposited or molten silicon can fall to the outside of the vessel naturally as will be described hereinafter.

Figure 3:
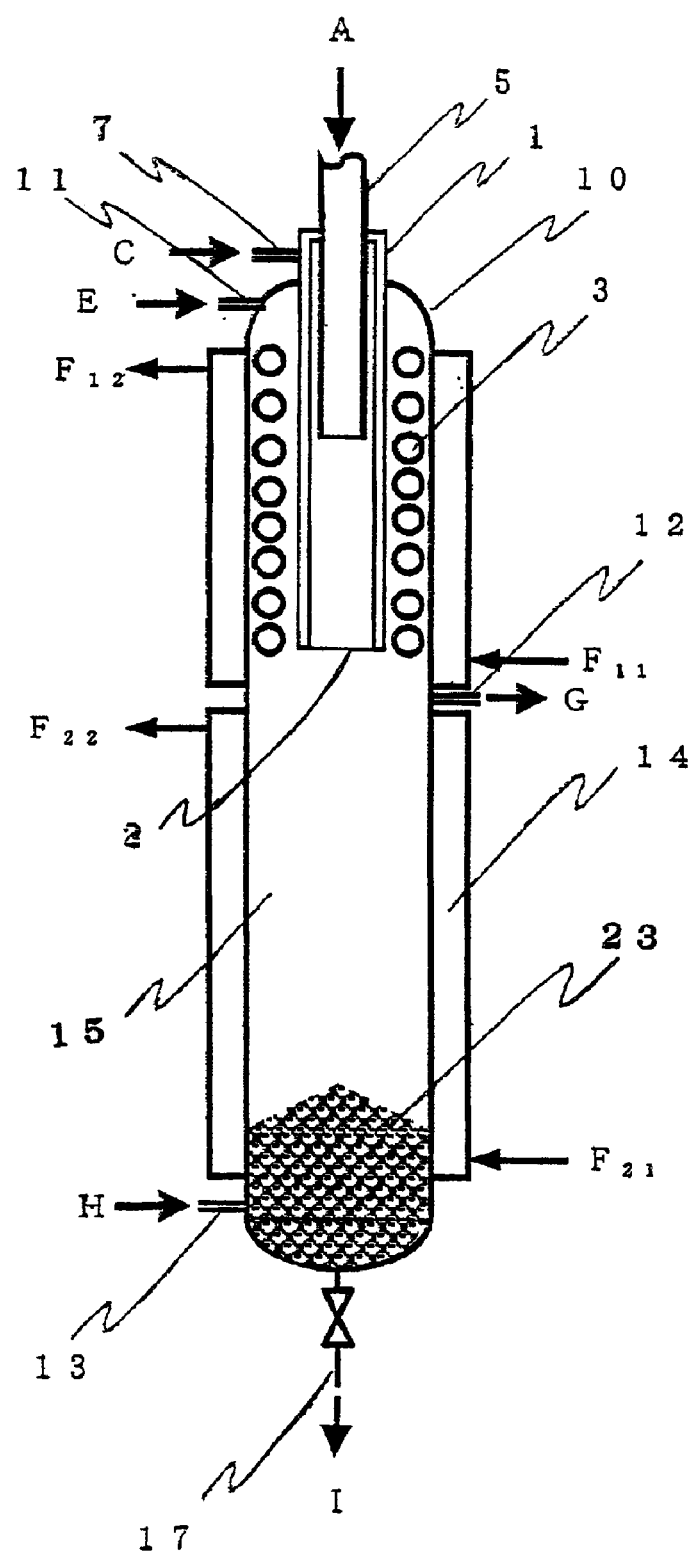
FIG. 3 is a schematic diagram of a typical embodiment of the polycrystalline silicon production apparatus of the present invention.
Figure 4:
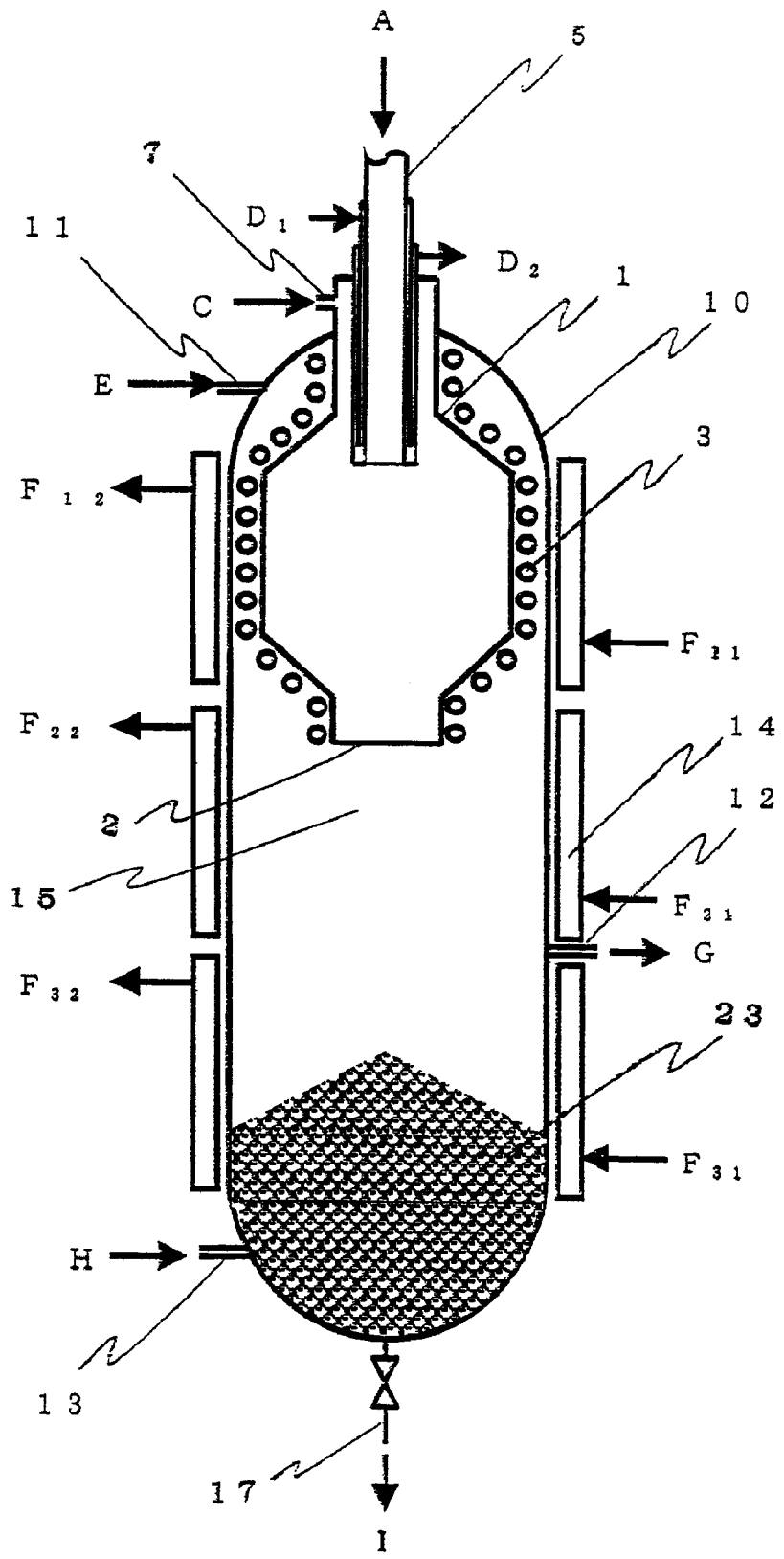
FIG. 4 is a schematic diagram of another typical embodiment of the polycrystalline silicon production apparatus of the present invention.

Therefore, the sectional form of the cylindrical vessel 1 may be any form such as a circular or polygonal form. The cylindrical vessel 1 may be formed to have a straight barrel with an equal sectional area at any position as shown in FIGS. 1 to 3 to facilitate its production, or the sectional area of part of the vessel may be made larger than other part as shown in FIG. 4 to improve the conversion of a chlorosilane into silicon (may be simply referred to as "conversion" hereinafter) by extending the residence time of reaction gas.

Meanwhile, the open state of the opening 2 of the cylindrical vessel 1 may be such that it is straight open as shown in FIG. 1 or a contraction portion may be formed to reduce the diameter gradually toward the lower end.

When the opening 2 of the cylindrical vessel 1 may be constituted such that its periphery is horizontal, silicon molten liquid droplets can be dropped without a problem. However, the opening is preferably constituted such that its periphery is inclined as shown in FIG. 5 or its periphery is wavy as shown in FIG. 6, thereby making it possible to make uniform the diameters of the silicon molten liquid droplets falling from the periphery of the opening 2.

Further, to make uniform the diameters of the molten silicon droplets regardless of the shape of the periphery of the above opening, the opening is preferably edged by reducing the thickness toward the end.

Since the above cylindrical vessel 1 is heated at 1,430° C. or more and the inside of the vessel is contacted to a chlorosilane or silicon molten liquid, it is desirable to choose a material which can stand the above temperature condition and a substance to be contacted therewith for the long-term stable production of silicon.

Examples of the material include individual materials such as carbon materials including graphite and ceramic materials including silicon carbide (SiC), silicon nitride ($Si_3N_4$), boron nitride (BN) and aluminum nitride (AlN), and composite materials thereof.

It is particularly preferred for continuous industrial that a carbon material should be used as the base material and at least a contact portion with the silicon molten liquid should be covered with silicon nitride, boron nitride or silicon carbide to greatly extend the service life of the cylindrical vessel.

In the silicon production apparatus of the present invention, the above cylindrical vessel 1 is provided with a heater 3 for heating the wall of the cylindrical vessel 1 from the lower end to a desired height at a temperature equal to or higher than the melting point of silicon. The width to be heated at the above temperature, that is, the height of the heater 3 from the lower end of the cylindrical vessel 1 may be suitably determined in consideration of the size of the cylindrical vessel and the above heating temperature and further the amount of a chlorosilane to be supplied. As the range of the cylindrical vessel to be heated at a temperature equal to or higher than the melting point of silicon by the heater, the length from the lower end is generally 20 to 90%, preferably 30 to 80% of the total length of the cylindrical vessel 1.

Any known heating means may be used as the heater 3 if it can heat the inner wall of the cylindrical vessel at a temperature equal to or higher than the melting point of silicon, that is, 1,430° C. or more.

The heater is, for example, a device for heating the inner wall of the cylindrical vessel by external energy as shown in FIG. 1. More specifically, heaters making use of high frequency, heaters making use of a heating wire and heaters making use of infrared radiation may be used.

Out of these, heaters making use of high frequency are preferred because the cylindrical vessel can be heated at an uniform temperature while the shape of the heating coil for radiating high frequency is made simple.

In the silicon production apparatus of the present invention, the chlorosilane feed pipe 5 is used to directly supply a chlorosilane A into the space 4 surrounded by the inner wall of the cylindrical vessel 1 heated at a temperature equal to or higher than the melting point of silicon and is open in the space 4 in a downward direction.

The term "downward" indicating the opening direction of the chlorosilane feed pipe 5 is not limited to a vertical direction only but includes a case where the chlorosilane feed pipe 5 is open such that the fed chlorosilane is not contacted to the opening again. However, it is the most preferred that the chlorosilane feed pipe 5 is installed in a direction perpendicular to the plane.

The chlorosilane supplied from the chlorosilane feed pipe 5 has a higher thermal decomposition temperature than monosilane which is another silicon source material. Even if the inside of the pipe is heated in the space 4 of the cylindrical vessel heated at a temperature equal to or higher than the melting point of silicon, the chlorosilane does not decompose violently but cooling is preferably carried out to prevent the deterioration of the feed pipe by heat or the decomposition of the chlorosilane though it is small in quantity.

Although the cooling means is not particularly limited, a liquid jacket for cooling by forming a flow passage for a refrigerant such as water or heat medium oil to supply it from $D_1$ and discharge it from $D_2$ as shown in FIG. 1 or an air cooling jacket (not shown) for cooling a center nozzle by forming two or more multi-ring nozzles in the chlorosilane feed pipe to supply a chlorosilane from a center portion and purge cooling gas from the outer ring nozzle may be employed.

As for the temperature for cooling the chlorosilane feed pipe, the chlorosilane feed pipe may be cooled to such an extent that the material forming the feed pipe does not deteriorate considerably, generally a temperature lower than the self-decomposition temperature of the fed chlorosilane. The chlorosilane feed pipe is preferably cooled to 600° C. or less. More specifically, when TCS or silicon tetrachloride ($SiCl_4$, to be abbreviated as STC hereinafter) is used as a source material, it is preferably cooled to 800° C. or less, more preferably 600° C. or less, the most preferably 300° C. or less.

The same material as the cylindrical vessel 1, quartz glass, iron and stainless steel may be used as the material of the chlorosilane feed pipe 5.

In another embodiment of the silicon production apparatus of the present invention in which an expanded portion is formed in part of the cylindrical vessel as shown in FIG. 4, the opening of the above chlorosilane feed pipe is preferably installed in the space of the expanded portion. Thereby, the opening can be separated from the heated inner wall and cooling can be carried out easily to prevent the deposition of silicon on the chlorosilane feed pipe.

In the present invention, the first seal gas feed pipe 7 is provided to supply seal gas B into the space defined by the inner wall of the cylindrical vessel existent above the opening of the chlorosilane feed pipe 5 and the outer wall of the chlorosilane feed pipe. That is, in the present invention, a chlorosilane supplied as a source material is directly supplied into a high-temperature space where the melting of silicon occurs to prevent the deposition of solid silicon by contacting a low-temperature region where silicon can be deposited but not molten on the inner wall of the cylindrical vessel. However, a similar low-temperature region is existent in the space formed by the inner wall of the cylindrical vessel and the outer wall of the chlorosilane feed pipe.

Therefore, in the apparatus of the present invention, the deposition of solid silicon in the low-temperature region by entry of a mixed gas of a chlorosilane and hydrogen can be effectively prevented by providing the first seal gas feed pipe 7 for supplying seal gas into the above space to fill seal gas in the space where the above low-temperature region is existent.

In the present invention, the first seal gas feed pipe 7 is not particularly limited if it is located above the opening of the chlorosilane feed pipe 5 but preferably attached to the wall of the cylindrical vessel where the heater 3 is not existent.

The seal gas supplied from the first seal gas feed pipe 7 is preferably gas which does not form silicon and does not exert a bad influence upon the formation of silicon in the region where the chlorosilane is existent. Specifically, it is preferably an inert gas such as argon or helium, or hydrogen to be described hereinafter.

In this case, it will suffice if the seal gas is supplied to such an extent that a pressure at which the seal gas always fills the space where the above temperature gradient is existent is maintained. In order to reduce the supply of the seal gas, the shape of the cylindrical vessel 1 or the shape of the outer wall of the chlorosilane feed pipe may be determined to reduce the sectional area of the whole space or the lower portion.

In the silicon production apparatus of the present invention, the hydrogen feed pipe for supplying hydrogen to be used in a deposition reaction together with the chlorosilane is not particularly limited if it is open at a position where it can supply hydrogen into the above space 4 of the cylindrical vessel 1 independent of the chlorosilane feed pipe 5.

Therefore, the hydrogen feed pipe is preferably installed at a position where a reaction between hydrogen and the chlorosilane can be efficiently carried out in consideration of the structure and size of the cylindrical vessel 1 constituting the silicon production apparatus. Stated more specifically, in FIG. 1, it is preferred to supply hydrogen C from the first seal gas feed pipe 7 as the seal gas. As shown in FIG. 2, the hydrogen feed pipe 8 for supplying hydrogen C may be connected to the side wall of the cylindrical vessel 1. As a matter of course, the above two embodiments may be combined.

As described above, the polycrystalline silicon production apparatus of the present invention is characterized in that:
(1) the deposition and melting of silicon are carried out on the inner wall of the cylindrical vessel,
(2) the chlorosilane feed pipe is inserted into the silicon melting region in the inside of the cylindrical vessel, and
(3) seal gas is supplied into the space between the cylindrical vessel and the chlorosilane feed pipe.

According to the above feature (1), the heat efficiency of a heated surface for carrying out the deposition and melting of silicon can be greatly increased industrially advantageously.

Due to a combination of the features (2) and (3), solid silicon can be completely prevented from remaining deposited without being molten in the apparatus.

In the silicon production apparatus of the present invention, other structures are not particularly limited but a preferred embodiment is given below. For instance, at least the opening at the lower end of the cylindrical vessel is preferably covered by a closed vessel 10 connected to an exhaust gas discharge pipe 12 to collect exhaust gas generated in the cylindrical vessel 1 efficiently and to collect silicon molten droplets dropping from the opening 2 of the cylindrical vessel 1 by solidifying the droplets by cooling without contacting the outside air. Thereby, high-purity silicon can be industrially obtained.

A typical embodiment of the above closed vessel 10 is shown in FIG. 3 and FIG. 4. Preferably, the opening 2 which is a silicon take-out port of the cylindrical vessel 1 is covered, a cooling space 15 into which a silicon molten liquid can be dropped is formed, and a gas discharge pipe 12 for taking out exhaust gas is provided.

The above closed vessel 10 may be disposed such that it covers the lower end of the cylindrical vessel in such a manner that an end portion of the opening 2 of the cylindrical vessel 1 projects. For example, it may be connected to the outer wall of the cylindrical vessel near the opening. However, since it is very likely that the low-temperature region where the above solid silicon separates out is existent on the surface of the closed vessel at a position away from the connection position, as shown in FIG. 3 and FIG. 4, it is preferably connected to the outer wall of an upper portion of the cylindrical vessel away from the high-temperature region including the opening or provided to cover the entire cylindrical vessel.

The chlorosilane contained in the gas exhausted from the cylindrical vessel 1 is close to stable gas composition from which silicon is not deposited any more and even if silicon is deposited therefrom, its amount is very small.

However, to prevent the deposition of solid silicon on the closed vessel 10 as much as possible, as shown in FIG. 3 and FIG. 4, a second seal gas feed pipe 11 for supplying seal gas E into the space defined by the outer wall of the cylindrical vessel and the inner wall of the closed vessel is preferably provided.

The type and supply of the above seal gas may be determined in the same manner as when the seal gas is supplied to the first seal gas feed pipe 7.

In the above embodiment, the linear speed of the seal gas circulating around the cylindrical vessel 1 is set to at least 0.1 m/s, preferably 0.5 m/s, the most preferably 1 m/s or more to fully develop the effect of the seal gas.

The material of the closed vessel 10 is suitably selected from metal materials, ceramic materials and glass materials but the inside of a collection chamber made from metal is preferably lined with silicon, Teflon or quartz glass to obtain a firm industrial apparatus and collect high-purity silicon at the same time.

The exhaust gas after the reaction in the cylindrical vessel 1 is taken out from the gas exhaust pipe 12 provided in the closed vessel 10.

The molten silicon dropped from the cylindrical vessel 1 is cooled while it falls in the cooling space 15 of the closed vessel 10 or when it contacts a coolant existent on the bottom, stored in the lower portion of the vessel as solidified silicon 23 and cooled to a temperature at which it is easy to handle. When the above cooling space is formed fully long, granulated silicon is obtained and when the cooling space is short, elastically deformed solid silicon is obtained by drop impact.

The foamed polycrystalline silicon of the present invention can be efficiently produced by suitably setting the length of the space 15 in which the silicon molten liquid formed in the presence of hydrogen on the inner wall of the cylindrical vessel is naturally dropped as droplets and solidified and conditions for cooling the bottom serving as a coolant.

It is preferred to provide a cooling gas H feed pipe 13 to promote cooling. Not shown in the figure, a solid or liquid coolant may be existent at the bottom of the closed vessel 10 separately to cool silicon molten liquid droplets more powerfully as required. Silicon, copper or molibden may be used as the solid coolant. Liquid silicon tetrachloride or liquid nitrogen may be used as the liquid coolant.

A take-out port 17 for continuously or intermittently taking out solidified silicon 1 may be formed in the closed vessel 10 as required. When silicon is obtained in a partly agglomerated state, it is preferred to adopt such a structure that the lower portion of the closed vessel can be exchanged.

To cool the above silicon more effectively, the closed vessel 10 is preferably provided with a cooling unit 14. As shown in FIG. 3 and FIG. 4, a liquid jacket is the most preferred in which a flow passage for circulating a refrigerant liquid such as water, heat medium oil or alcohol from $F_{11}$ to $F_{12}$, from $F_{21}$ to $F_{22}$ or from $F_{31}$ to $F_{32}$ is formed to cool silicon.

As shown in FIG. 3 and FIG. 4, when the closed vessel 10 is connected to an upper portion of the cylindrical vessel, the cooling unit may have a suitable jacket structure to protect the material so that a refrigerant such as heat medium oil can be circulated. When the material has heat resistance, an adiabator may be used to improve a heat effect, thereby making it possible to obtain heat insulation.

As understood from the above description, the foamed polycrystalline silicon of the present invention generates an extremely small amount of fine grains by crushing for the production of granular polycrystalline silicon and is soft before crushing and extremely useful as a silicon source in various polycrystalline silicon application fields.

The method of producing foamed polycrystalline silicon of the present invention is capable of producing foamed polycrystalline silicon with high reproducibility and stability and is useful when it is carried out on an industrial scale.

Further, the polycrystalline silicon production apparatus of the present invention is suitable for use in the above method of producing foamed polycrystalline silicon and an industrially extremely useful apparatus capable of continuously producing polycrystalline silicon including polycrystalline silicon other than the above stably at a high speed for a long time.

EXAMPLES

The following examples are provided for the purpose of further illustrating the present invention but are in no way to be taken as limiting.

The grain diameter was measured in accordance with JIS-Z8801.

Example 1

A polycrystalline silicon production apparatus similar to the apparatus shown in FIG. 3 was constructed to continuously produce polycrystalline silicon as follows.

A high-frequency induction heating coil was mounted as the heater 3 around a silicon carbide cylindrical vessel 1 having an opening 2 in a lower portion and an inner diameter of 25 mm and a length of 50 cm from a position 10 cm from the top to the lower end of the cylindrical vessel 1. A stainless steel chlorosilane feed pipe 5 having an inner diameter 10 mm and an outer diameter 17 mm and a jacket structure through which a liquid can be circulated as shown in FIG. 2 was inserted into the cylindrical vessel 1 to a height of 15 cm from the upper end of the cylindrical vessel. The closed vessel 10 had an inner diameter of 500 mm and a length of 3 m and was made from stainless steel.

The periphery of the lower end of the above cylindrical vessel had a shape shown in FIG. 5.

Water was let pass through the cooling jacket of the chlorosilane feed pipe to maintain the inside of the pipe at 50° C. or less, water was also let pass through the lower jacket of the closed vessel 10, hydrogen gas was circulated from the hydrogen feed pipe 14 at an upper portion of the cylindrical vessel 1 and the seal gas feed pipe 11 at an upper portion of the closed vessel 10 at a rate of 5 liters/min, and then the high-frequency heater was activated to heat the cylindrical vessel 1 at 1,500° C. The inside pressure of the vessel was almost atmospheric pressure.

When trichlorosilane was supplied to the chlorosilane feed pipe 5 at a rate of 10 g/min, it was observed that granular silicon droplets having almost the same diameter fell naturally at a rate of about 0.6 g/min. In this case, the conversion of trichlorosilane was about 30%.

The silicon molten liquid was separated and dropped from the opening of the cylindrical vessel. At this point, the end of the opening in the lower portion of the cylindrical vessel got fully wet with silicon and the surface was covered with silicon.

When operation was suspended and the inside of the apparatus was opened and observed after a reaction was continued for 50 hours, blocking with silicon did not occur.

The above separated and dropped silicon molten liquid droplets were naturally dropped and contacted to a cooling acceptor 9 installed at the bottom of the closed vessel 7 in 0.5 second.

The cooling acceptor 9 was cooled by filing the previously obtained foamed polycrystalline silicon grains therein to maintain its surface temperature at 300° C.

The apparent density of the obtained foamed polycrystalline silicon 10 was 1.66 g/cm³.

When the above foamed polycrystalline silicon was crushed, grains having no fixed shape and an average grain volume of 0.1 cc were obtained. When each grain was broken by a hammer, a large number of cavities formed by bubbles were observed on its broken section. When the silicon grain was polished with diamond to observe its section, a large number of cavities formed by bubbles having a diameter of 0.5 to 1 mm were existent in the center portion.

When 100 g of the above grains of the foamed polycrystalline silicon were crushed to a maximum grain diameter of 2 mm or less by a jaw crusher to measure the grain diameter of the crushed product by the SK LASER PRO-7000 laser diffraction scattering grain size distribution measuring instrument (of Seishin Kogyo Co., Ltd.), the proportion of fine grains passing through a sieve having an opening of 180 μm was less than 0.05%.

Example 2

Foamed polycrystalline silicon was obtained under the same conditions as in Example 1 except that a silicon molten liquid was formed from silicon tetrachloride as a source material.

When the apparent density of the solidified grain was measured, it was 2.05 g/cm³.

When the grain diameter of the crushed product obtained in the same manner as in Example 1 was measured, the proportion of fine grains passing through a sieve having an opening of 180 μm was 0.2%.

Example 3

A silicon molten liquid was formed by filling a graphite cylindrical vessel having a hole in a lower portion with solid silicon and heating at 1,500° C. with high frequency in a hydrogen atmosphere in stead that a silicon molten liquid was formed by reacting trichlorosilane with hydrogen. Further, after it was kept in a molten state for 30 minutes in the presence of hydrogen, it was pressurized with hydrogen from above and dropped from the hole in the lower portion.

The separated and dropped silicon molten liquid droplets were dropped naturally and contacted to a cooling acceptor 9 installed at the lower portion in 0.5 second.

The cooling acceptor 9 was cooled by filling the previously obtained foamed polycrystalline silicon grains therein to maintain its surface temperature at 300° C.

When the apparent density of the solidified grain was measured, it was 2.11 g/cm$^3$.

When the grain diameter of the crushed product obtained in the same manner as in Example 1 was measured by the SK laser, the proportion of fine grains passing through a sieve having an opening of 180 μm was 0.2%.

Comparative Example 1

Polycrystalline silicon was obtained under the same conditions as in Example 1 except that the time elapsed until the grain was contacted to the cooling acceptor was 0.05 second. Visible bubbles were not observed in the obtained polycrystalline silicon grain. The apparent density of the grain was 2.25 g/cm$^3$.

When the grain diameter of the crushed product obtained in the same manner as in Example 1 was measured, the proportion of fine grains passing through a sieve having an opening of 180 μm was 1%.

Comparative Example 2

A quartz plate heated at 1,350° C. with a heater installed on its lower portion was used as the cooling acceptor to gradually cool the grain in Example 1.

Bubbles were not existent in this silicon. The apparent density of the grain was 2.33 g/cm$^3$.

When the grain diameter of the crushed product obtained in the same manner as in Example 1 was measured, the proportion of fine grains having a diameter of 200 μm or less was 2%.

Comparative Example 3

A stainless steel chlorosilane feed pipe 5 having an inner diameter of 10 mm and an outer diameter of 17 mm and the cooling jacket structure 6 of Example 1 was inserted to a height of 5 cm from the top of the cylindrical vessel. Operation was carried out under the same conditions as in Example 1.

Granular silicon could be obtained at a rate of about 0.6 g/min at the beginning of operation but after 15 hours, it became difficult to supply trichlorosilane and seal hydrogen.

When the apparatus was opened and observed after suspension, an upper portion and a portion therearound of the inside of the cylindrical vessel 1 were almost blocked. The blocking material was silicon.

Example 4

Granular silicon was continuously obtained by constructing a silicon production apparatus shown in FIG. 4 as follows.

A high-frequency induction heating coil was mounted as the heater 3 on a silicon carbide cylindrical vessel 1 having a total length of 50 cm around a position 10 cm from the upper end to the lower end, in which the inner diameter of the insertion portion of the chlorosilane feed pipe 5 and the opening 2 was 25 mm and the inner diameter of a 20 cm center portion was expanded to 50 mm, and a tapered portion was formed as long as 5 cm. The stainless steel chlorosilane feed pipe 5 having a jacket structure capable of circulating a liquid and an inner diameter of 10 mm and an outer diameter of 17 mm shown in FIG. 2 was inserted into the cylindrical vessel 1 to a height of 15 cm from the upper end. The closed vessel 10 was made from stainless steel and had an inner diameter of 750 mm and a length of 3 m.

The periphery of the lower end of the above cylindrical vessel had a shape shown in FIG. 6.

Water was let pass through the cooling jacket of the chlorosilane feed pipe to maintain the inside of the pipe at 50° C. or less, water was also let pass through the lower jacket of the closed vessel, hydrogen gas was circulated from the hydrogen feed pipe 14 at an upper portion of the cylindrical vessel 1 and the seal gas feed pipe 21 at an upper portion of the closed vessel 10 at a rate of 5 liters/min, and then the high-frequency heater was activated to heat the cylindrical vessel 1 at 1,500° C. The inside pressure of the vessel was almost atmospheric pressure.

When trichlorosilane was supplied to the chlorosilane feed pipe 5 at a rate of 10 g/min, it was observed that granular silicon droplets having almost the same diameter fell naturally at a rate of about 1 g/min. In this case, the conversion of trichlorosilane was about 50%.

When operation was suspended and the inside of the apparatus was opened and observed after a reaction was continued for 50 hours, blocking with silicon did not occur.

What is claimed is:

1. Foamed polycrystalline silicon which has bubbles therein and an apparent density of 2.20 g/cm$^3$ or less.

2. The foamed polycrystalline silicon of claim 1 which is in the form of an assembly of independent grains or an agglomerate of independent grains.

3. The foamed polycrystalline silicon of claim 2, wherein the assembly of independent grains contains independent grains each having a weight of 0.2 to 2 g in an amount of 50 g or more based on 100 g.

4. The foamed polycrystalline silicon of claim 2, wherein the assembly of independent grains is formed by breaking up the agglomeration of an agglomerate of independent grains.

5. The foamed polycrystalline silicon of claim 1, wherein a plurality of independent bubbles are contained and are existent in a center portion of a grain.

6. A crushed product of the foamed polycrystalline silicon of claim 1.

7. The crushed product of claim 6 which has an average grain diameter in the range of greater than 200 μm to 5 mm.

8. A method of producing foamed polycrystalline silicon comprising dropping droplets of silicon containing hydrogen which has been molten in the presence of hydrogen in 0.2 to 3 seconds and cooling the droplets until hydrogen bubbles are locked up in the droplets.

9. The method of claim 8, wherein dropping is carried out for 0.2 to 2 seconds.

10. The method of claim 8, wherein a silicon deposition reaction between hydrogen and a chlorosilane and a reaction for melting the deposited silicon in the presence of hydrogen are carried out simultaneously to prepare silicon droplets containing the hydrogen.

11. A polycrystalline silicon production apparatus comprising:

(a) a cylindrical vessel having an opening which is a silicon take-out port at the lower end;

(b) a heater for heating the inner wall from the lower end to a desired height of the cylindrical vessel at a temperature equal to or higher than the melting point of silicon;

(c) a chlorosilane feed pipe which is composed of an inner pipe having a smaller outer diameter than the inner diameter of the cylindrical vessel and constituted such that one opening of the inner pipe faces down in a space surrounded by the inner wall heated at a temperature equal to or higher than the melting point of silicon; and (d) a first seal gas feed pipe for supplying seal gas into a space defined by the inner wall of the cylindrical vessel and the outer wall of the chlorosilane feed pipe.

12. The apparatus of claim 11, which further comprises (e) a hydrogen gas feed pipe for supplying hydrogen gas into the above cylindrical vessel.

13. The apparatus of claim 11, wherein a cooling acceptor for receiving droplets falling from the lower end of the cylindrical vessel is disposed in a lower portion of the cylindrical vessel with a space therebetween.

14. The polycrystalline silicon production apparatus of any one of claims 11 to 13 further comprising a closed vessel which covers at least a lower end portion of the cylindrical vessel, forms a space in the lower portion of the cylindrical vessel and is provided with an exhaust gas discharge pipe, and a second seal gas feed pipe for supplying seal gas into a space defined by the outer wall of the cylindrical vessel and the inner wall of the closed vessel.

* * * * *